(12) United States Patent
Yermalayeu

(10) Patent No.: US 9,411,754 B2
(45) Date of Patent: Aug. 9, 2016

(54) DYNAMIC FREQUENCY MEMORY CONTROL

(75) Inventor: Siarhei Yermalayeu, Eindhoven (NL)

(73) Assignee: ST-ERICSSON SA, Plan-les-Ouates (CH)

( * ) Notice: Subject to any disclaimer, the term of this patent is extended or adjusted under 35 U.S.C. 154(b) by 694 days.

(21) Appl. No.: 13/393,928

(22) PCT Filed: Aug. 27, 2010

(86) PCT No.: PCT/EP2010/062568
§ 371 (c)(1),
(2), (4) Date: Mar. 2, 2012

(87) PCT Pub. No.: WO2011/029734
PCT Pub. Date: Mar. 17, 2011

(65) Prior Publication Data
US 2012/0173836 A1  Jul. 5, 2012

(30) Foreign Application Priority Data
Sep. 9, 2009  (EP) .................................. 09169816

(51) Int. Cl.
*G06F 12/00* (2006.01)
*G06F 13/16* (2006.01)

(52) U.S. Cl.
CPC ........ *G06F 13/1689* (2013.01); *G06F 13/1694* (2013.01); *Y02B 60/1228* (2013.01)

(58) Field of Classification Search
CPC ... G06F 13/1689; G06F 13/4243; G11C 7/22; G11C 7/1072
USPC ........................................................ 711/167
See application file for complete search history.

(56) References Cited

U.S. PATENT DOCUMENTS

| | | | |
|---|---|---|---|
| 6,175,929 B1 * | 1/2001 | Hsu et al. | 713/500 |
| 6,738,810 B1 * | 5/2004 | Kramer et al. | 709/224 |
| 6,859,884 B1 * | 2/2005 | Sullam | 713/322 |
| 7,046,057 B1 * | 5/2006 | Culler | 327/156 |
| 7,203,779 B2 * | 4/2007 | Muroor | 710/107 |
| 7,350,094 B2 * | 3/2008 | Tsai et al. | 713/500 |
| 7,949,818 B2 * | 5/2011 | Suyama | 711/103 |
| 2004/0103330 A1 * | 5/2004 | Bonnett | 713/322 |

(Continued)

OTHER PUBLICATIONS

International Preliminary Report on Patentability issued in International application No. PCT/EP2010/062568, issued on Mar. 13, 2012.

(Continued)

*Primary Examiner* — Charles Rones
*Assistant Examiner* — Nanci Wong
(74) *Attorney, Agent, or Firm* — Patent Portfolio Builders PLLC

(57) ABSTRACT

A memory controller (40) is adaptable to scaling of a system clock frequency, to enable another device (10) to access a memory (20), and has a part for outputting control signals having some timing characteristics not entirely scalable with scaling of the system clock frequency. In response to an indication of a change in a frequency of the system clock, the memory controller adapts the part autonomously to enable it to output new digital memory control signals synchronized to the changed system clock and which also have the non scalable timing characteristics. This avoids the need for the processor to adapt the memory controller. Hence the adaptation can be carried out more quickly, leading to less disruption to other parts of the system and means the frequency scaling can be carried out more often.

15 Claims, 5 Drawing Sheets

(56) References Cited

U.S. PATENT DOCUMENTS

2005/0038970 A1   2/2005   Kim
2006/0274659 A1*  12/2006  Ouderkirk ............... 370/241
2007/0183192 A1   8/2007   Barnum et al.
2008/0195806 A1*  8/2008  Cope ........................ 711/111
2011/0239031 A1*  9/2011  Ware et al. ................ 713/500

OTHER PUBLICATIONS

International Search Report issued in corresponding International Application No. PCT/EP2010/062568, mailing date Jan. 27, 2011.
Written Opinion issued in corresponding International Application No. PCT/EP2010/062568, mailing date Jan. 27, 2011.

* cited by examiner

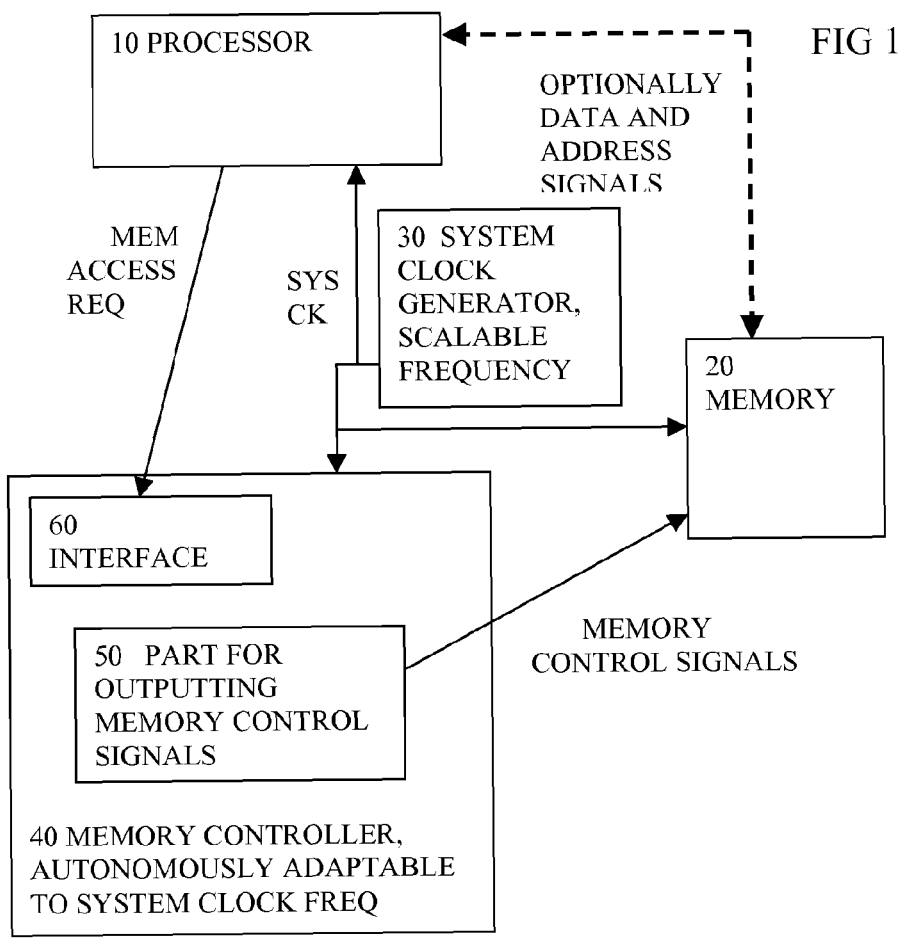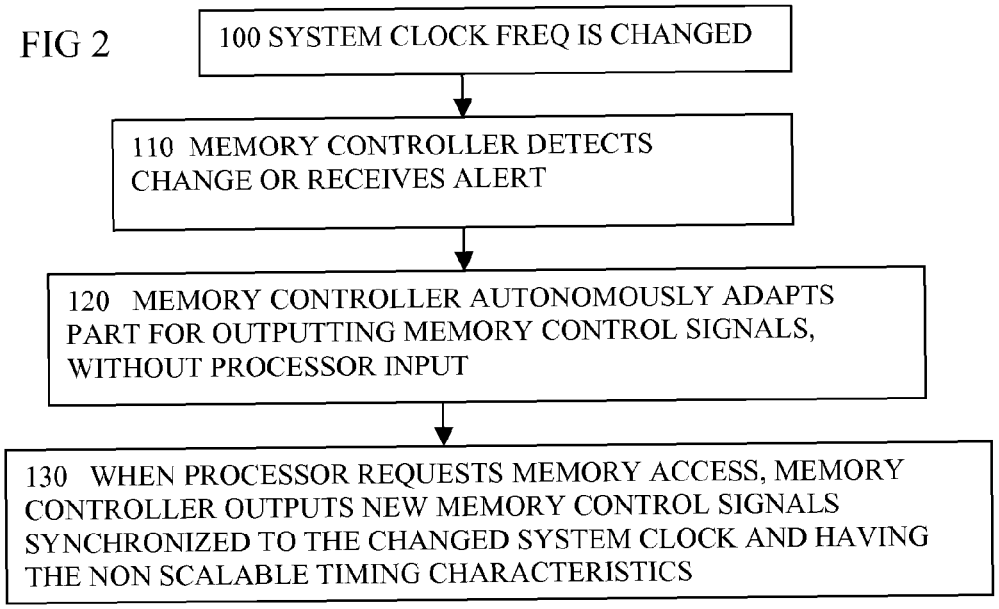

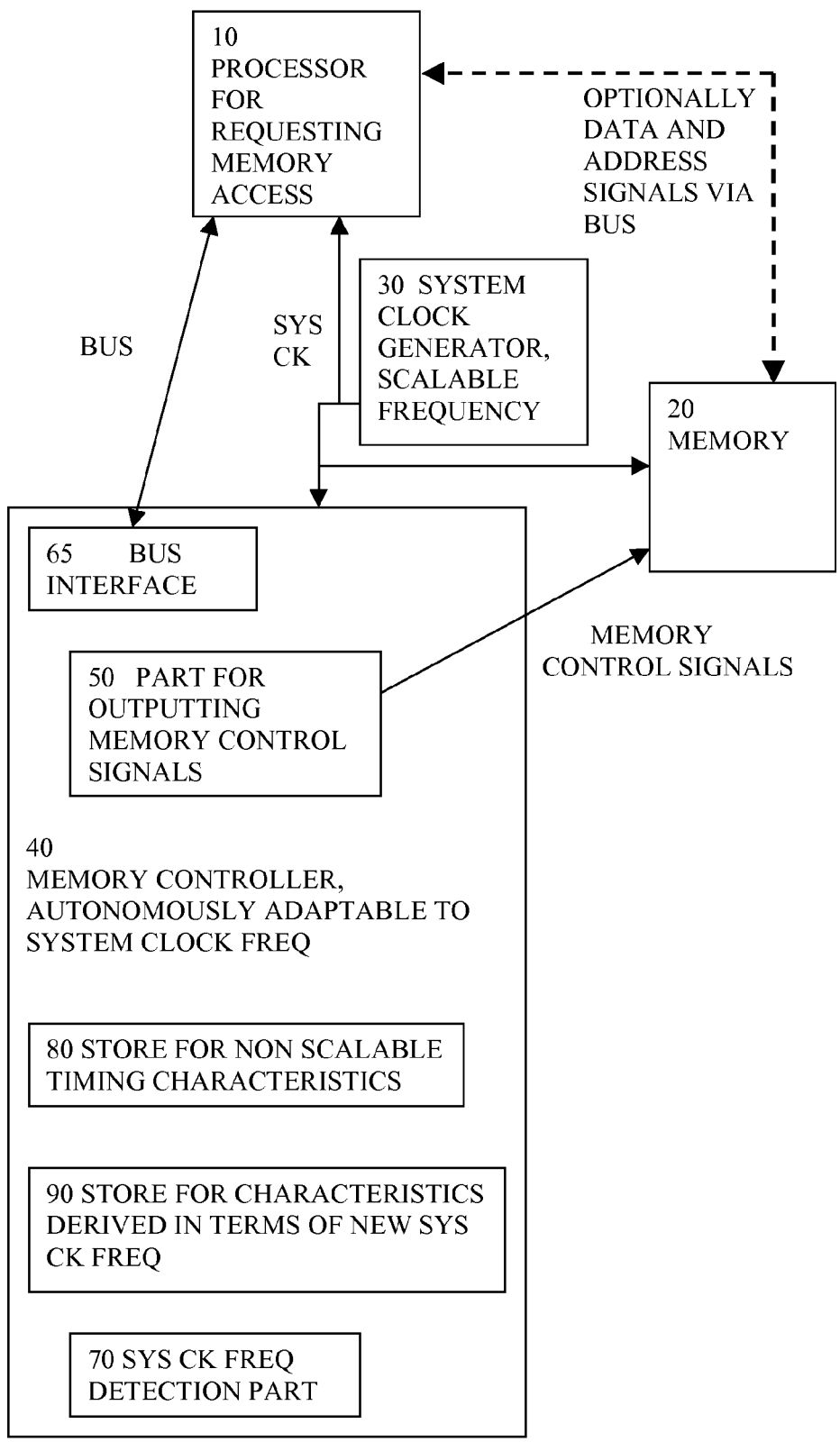

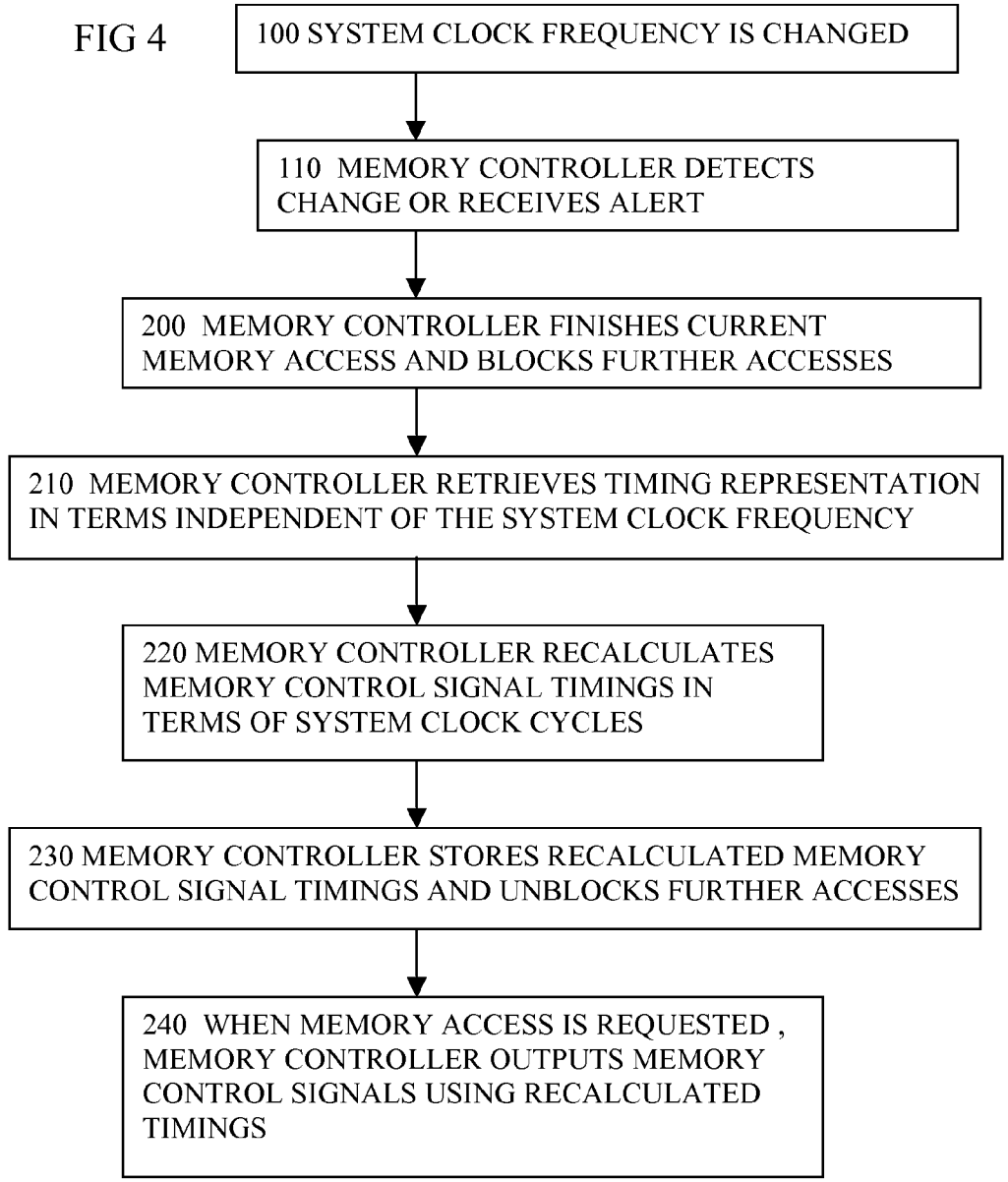

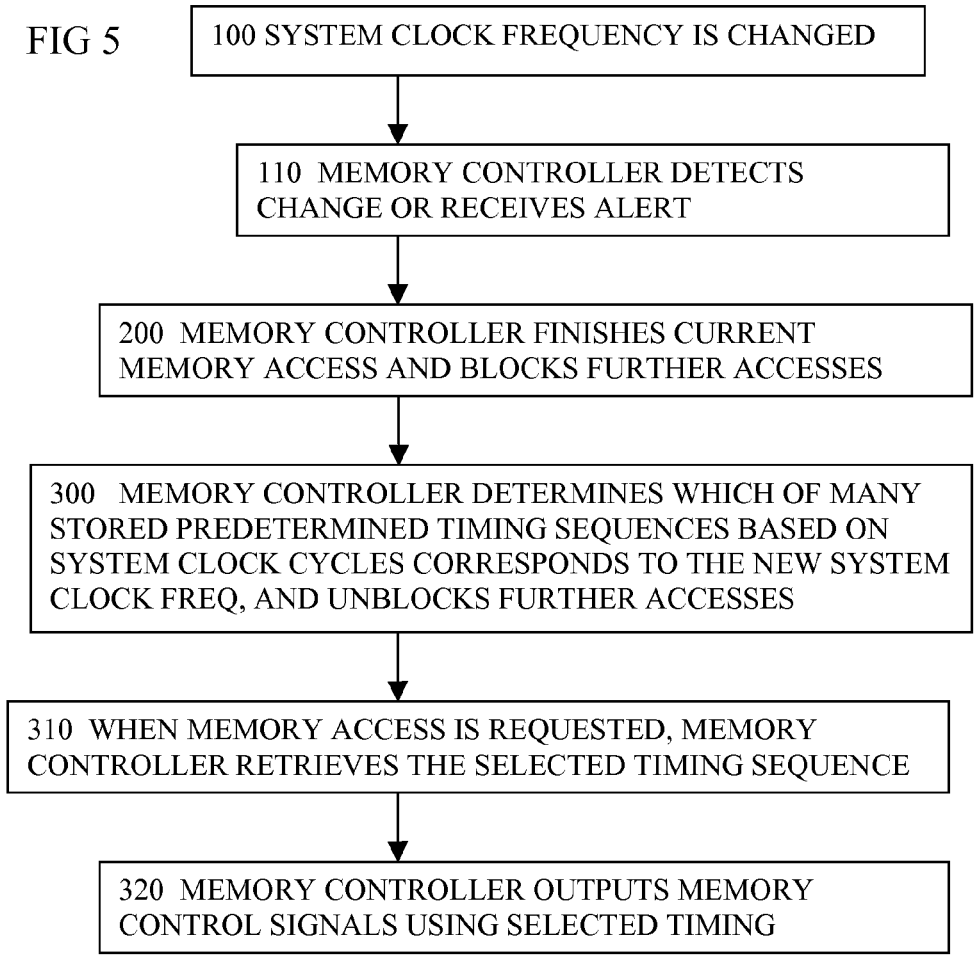

DYNAMIC FREQUENCY MEMORY CONTROL

FIELD OF THE INVENTION

This invention relates to memory controllers, especially RAM controllers, to systems having such controllers, especially computer systems, and to corresponding methods and software.

BACKGROUND OF THE INVENTION

Dynamic RAMs are characterized by having timing parameters that must be respected for proper memory operation. Examples are refresh interval (maximum time between two refresh commands must be issued to the memory), CAS latency (minimum time before the data becomes available after issuing a column address request). There are about several dozens of them described in the memory specification.

These timing parameters are coded in clock cycles assuming a known and constant memory clock frequency and they are typically programmed to the memory controller during the memory initialization. This was sufficient in the old days when the memory frequency was set once during initialization and has never changed since then. For modern battery operated devices power consumption is a critical technical and marketing requirement. A widely used techniques for power saving is dynamic frequency and voltage scaling (DFVS). For aggressive power management DFVS is applied constantly by monitoring the workload applied and adjusting the system performance and power level to match it. Typically DFVS scales CPU and system bus frequencies (sometimes both frequencies must maintain a certain ratio). Often memory controller and the DRAM run on the same clock as the system bus and thus DFVS applied on the system bus clock scales the memory clock as well. Note, that running memory synchronous to the system bus is usually the most power efficient way.

Scaling of the clock frequency used for memory accesses requires updating of the memory controllers timing parameters because they are typically coded in clock cycles. Owing to long latencies in such updating when scaling frequency/voltage, the DFVS algorithm is becoming very conservative since the costs of misprediction are high. Conservative DFVS algorithms therefore are less power efficient because they exploit fewer opportunities for power savings.

SUMMARY OF THE INVENTION

An object of the invention is to provide alternative memory controllers, especially RAM controllers, systems having such controllers, especially computer systems, and corresponding methods and software. According to a first aspect, the invention provides:

A memory controller adaptable to scaling of a system clock frequency, for producing digital memory control signals to enable another device to access a memory, the access being synchronized to the system clock, the control signals having some timing characteristics not entirely scalable with scaling of the system clock frequency, the memory controller having an interface to receive a memory access request from the other device, the memory controller also having a part arranged to output the digital memory control signals synchronized to the system clock in response to such a memory access request, and in response to an indication of a change in a frequency of the system clock, the memory controller being arranged to adapt the part autonomously to enable it to respond to a memory access request to output new digital memory control signals which are synchronized to the changed system clock and which also have the non scalable timing characteristics.

By having a memory controller able to adapt autonomously to the scalable frequency, there is no need for a processor to be programmed to determine how to adapt the memory controller. Hence the adaptation can be carried out more quickly and the period the memory is not available while the adaptation is carried out, can be reduced. This can result in less disruption to other parts of the system which need the memory, and means the frequency scaling can be carried out more often. This in turn means the power consumption can be reduced or that performance can be enhanced by increasing frequency to track peaks in demand more closely for example. Also, by making the memory controller more independent of the processor, it can mean that the software for the processor can be changed or developed more freely without needing to care about how promptly the processor will deal with the adapting of the memory controller.

Embodiments of the invention can have any other features added, some such additional features are set out in dependent claims and described in more detail below.

Other aspects of the invention include a method of producing digital memory control signals to enable another device to access a memory, the access being synchronized to a system clock, the control signals having some timing characteristics not entirely scalable with scaling of the system clock frequency, the method having the steps of receiving a memory access request from the other device, outputting the digital memory control signals synchronized to the system clock in response to such a memory access request, and in response to an indication of a change in a frequency of the system clock, determining new digital memory control signals to be output in response to subsequent memory access requests, the new digital memory control signals being synchronized to the changed system clock and also having the non scalable timing characteristics.

Another aspect provides a computer program on a computer readable medium having instructions for execution by a computing means to cause the method to be carried out. Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 1 shows a first embodiment of the invention,

FIG. 2 shows steps according to an embodiment,

FIG. 3 shows another embodiment of a system having a controller,

FIGS. 4 and 5 show method steps according to embodiments, and

DETAILED DESCRIPTION OF EMBODIMENTS

Figure 6:
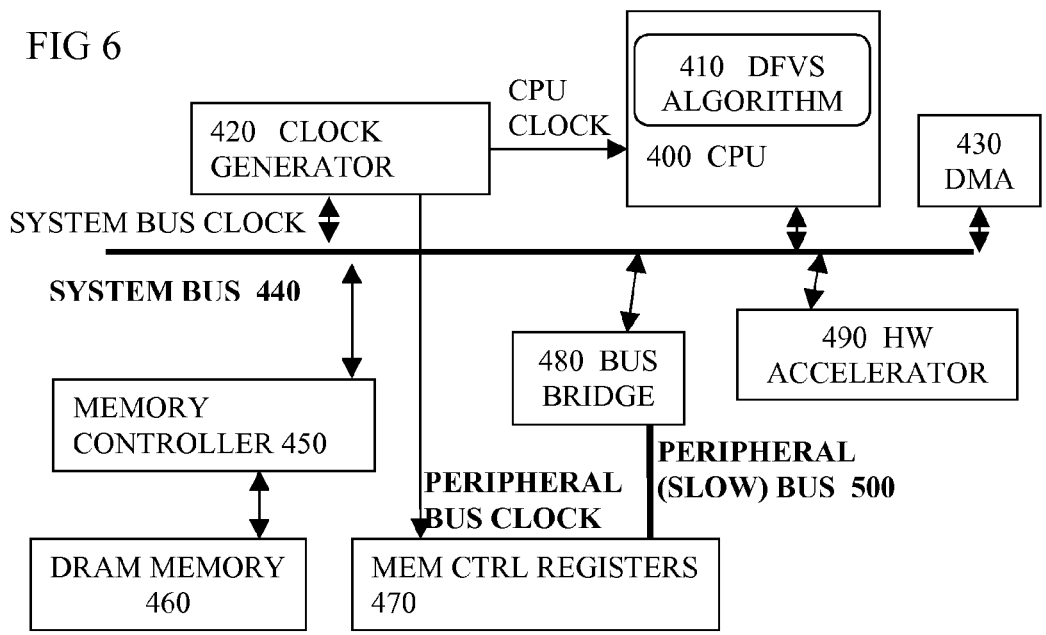
FIGS. 6 and 7 show features of other embodiments.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by digital logic implemented by standard or application specific integrated circuit parts or by discrete components or by any other means of carrying out the function. Thus, a processor with the necessary instructions for carrying out such a method or element of a method can form a means for carrying out the method or element of a method except where stated otherwise. Furthermore, an element described herein of an apparatus embodiment is an example of a means for carrying out the function performed by the element for the purpose of carrying out the invention. References to a signal can encompass any kind of signal in any medium, and so can encompass an electrical or optical or wireless signal or other signal for example.

In the description provided herein, numerous specific details are set forth. However, it is understood that embodiments of the invention may be practiced without these specific details. In other instances, well-known methods, structures and techniques have not been shown in detail in order not to obscure an understanding of this description.

References to a controller are intended to encompass any kind of controller in any kind of technology, integrated or discrete, analog or digital, application specific or general purpose controller running software and so on.

References to system clock are intended to refer to the clock used to synchronise the memory access between the access requesting device and the memory, even though other clocks may be used internally by these entities, and even if there are other clocks used by other parts of the system.

References to control signals are intended to encompass any kind of signals used by the memory, and can encompass for example any of address select signals such as row address and column address signals, data gating signals, refresh signals, read/write signals, or others.

Additional Features

In addition to the features set out in the summary of the invention section above, some additional features that will be described in more detail below are as follows.

The controller can be arranged to carry out the adapting by retrieving a stored representation of at least the non scalable timing characteristics, in terms independent of the system clock frequency. This is useful to enable efficient storage of the representations. The adapting can then involve converting them into terms related to the changed system clock frequency for use in generating the new digital memory control signals. This is useful to meet timing specifications for memory devices which are often specified in terms of numbers of clock cycles, with some limits in absolute time terms. This also enables the control signals to be synchronized readily to the system clock.

The controller can be arranged to carry out the adapting by selecting from a number of predetermined stored signal sequences, each corresponding to a different system clock frequency. This enables the amount of calculation to be reduced, but would typically use more storage resource and limits the granularity of the adaptation.

The controller can have a frequency change detector for monitoring the system clock to detect the change in frequency and output the indication of the change, or the indication of the change in system clock frequency can be received from an external device. This may be an external detector, or a device which initiates or requests a change in frequency, such as a power management device or a UART which is designed to wake up the system if it receives an incoming message for example.

The interface can comprise a bus interface, and the memory controller can be arranged to block any other devices coupled to the bus from initiating a memory access while the memory controller is adapting the signal generation part. This can help avoid or reduce memory access conflicts or mistimings if memory accesses were to take place during the adaptation.

The control signals can be suitable for a dynamic memory device having a refresh cycle.

The controller can be part of a system having the processor and the memory. The processor can be arranged to determine a level of processing demand, and to scale the system clock frequency according to the processing demand. The system can be incorporated in a personal mobile device such as a handheld or wearable communication or multimedia device of any type. The system can be incorporated in a battery powered device of any kind including mobile devices, laptop computers, vehicle mounted devices and so on.

Introduction to Some Issues Addressed by Some of the Embodiments

Memory controllers have typically all DRAM timing parameters programmed in clock cycles. Whenever memory frequency is changed to save power (known as dynamic frequency voltage scaling technique) the DRAM timing parameters have to be updated correspondingly. This requires special arrangement and comes at a cost of extra latency (more on that in prior art). These latencies are expensive since they limit the number of frequency voltage scaling possibilities (and thus increase power consumption) and also could cause undesired artifacts (i.e. hiccups). At least some of the embodiments can provide a solution to this problem by reducing the latencies.

A typical procedure for updating timing parameters of the memory controller requires special arrangement. Most importantly the memory must be guaranteed not to be used for any read/write requests while its timing parameters are being reprogrammed. Violating this requirement typically leads to a memory controller crash. Effectively all bus masters such as CPU, DMAs, etc have to be temporarily disabled from issuing memory accesses. This can be quite inconvenient if not impossible in some systems for the following reasons:

- some HW blocks simply could not be instantly disabled from issuing a memory request without stopping the whole HW block that typically requires some sort of reconfiguring to restart its functionality. This means extra latency.
- even if HW block supports suspending mode it can take some considerable time. For instance some DMAs may first need to finish the data transfer before they can be disabled.
- when memory reprogramming takes place during an on-going activity such as audio/video playback involving fetching data from the memory, stopping memory access for long time can cause audio hiccups and video distortion. In audio playback for instance audio output may have a FIFO with only 4 sample words available limiting maximum latency to about 90 ms best case and 45 ms worst case.

New timing parameters have to be computed on a CPU and programmed into the memory controller. Since configuration registers for the memory controller are typically connected to a slow (low frequency) bus (to reduce power) transferring new parameters takes also longer. The total latency could therefore be represented by the following formula:

$$T\text{latency} = T\text{disable\_bus\_masters} + T\text{compute\_params} + T\text{transfer\_params} + T\text{memctrl\_reprog}$$

Note that Tdisable_bus_masters depends on the number and type of bus masters.

Another known solution in some systems to avoid the aforementioned problem is to run memory on a separate asynchronous frequency and having a clock domain crossing in the memory controller itself. This approach has the following disadvantages:

- asynchronous domain crossing introduces access latency on each read/write request, which reduces available performance, bandwidth and thus is less power efficient.
- asynchronous memory clock frequency is typically rather high and thus limits the range of available voltage scaling for the corresponding voltage domain.

Features of the Embodiments

To address these issues, the memory controller is arranged to adapt itself autonomously. There are many ways of doing this. This is implemented in some embodiments by letting the memory controller know the exact timing parameters in absolute values (nanoseconds) of DRAM memory and the currently running frequency. Knowing both of them is sufficient for the memory controller to recomputed without any CPU or software (SW) involvement in adapting the internal state machine clock values for generating the control signals with timings to operate the memory. The DRAM timing parameters can be programmed once during initialization in the memory controller internal registers, or can be stored anywhere accessible to the memory controller.

There are several methods to deal with how to trigger the adaptation to the running clock frequency:

- The running frequency can be programmed in a separate memory controller register. Upon the frequency change, SW updates this value and controller is triggered to recalculate the timing parameters.
- A frequency detector can be provided for the memory controller, internally or externally. This can use a ring oscillator (or a similar kind of) circuit made available in the memory controller that constantly monitors the current frequency of the system clock and upon detecting a change beyond a given threshold, the controller recomputes the new values and reprograms the internal state machine used to generate the control signals.

There is a certain level of tolerance, which allows the memory to operate properly even if the parameters are not optimal. For instance refresh command can be sent more often then required (but not less often) or CAS latency can be larger than the minimum defined in the specification. The problem however that such non-optimality comes at the cost of extra overhead, reduced memory bandwidth. As a result CPU frequency may need to be increased to meet the deadlines and power goes up. It is therefore usually beneficial to have optimal timing parameters programmed in the memory controller from the power point of view.

Updating memory timing parameters on the fly can be a cumbersome task if done by SW as described above. It has now been appreciated that there are considerable benefits if this burden can be offloaded from SW/CPU to the memory controller itself. This can be implemented in some embodiments by having a representation stored in for example memory controller interface registers, of values of memory timing parameters in clock independent form. This can be in for example seconds (in practice nanoseconds or microseconds). In another embodiment the timing values are stored in the known location in external memory (SRAM or SDRAM) to save register file space. Knowing the currently running memory frequency the memory controller without external assistance can compute the required timing parameters in terms of clock cycles for example and store these in internal register files or externally.

Some embodiments of the invention involve a DRAM memory controller interface for efficient power management control. It can be applied to control all kinds of DRAM memories (such as synchronous dynamic random access memory SDRAM, double data rate DDR, low power double data rate LPDDR, etc) or any memory which has a refresh cycle, or other timing requirements which are not entirely scalable with frequency. It could be used in any system or device that has DRAM memory on-board and low-power consumption system requirement. Typically this can encompass a mobile portable battery-operated device (i.e. mobile phone or media player or video or still camera or multimedia device). At least some of the embodiments address the problem of on-the-fly dynamic power management by frequency/voltage scaling as it is used in the state-of-the art approach to controlling/programming memory controllers.

FIGS. 1 and 2, First Embodiment

FIG. 1 shows a first embodiment. A memory 20 is coupled to a processor 10, to a system clock generator 30 able to scale the clock frequency. A memory controller 40, is coupled to receive memory access requests from the processor, and output memory control signals, the memory controller being autonomously adaptable to scaling of the system clock frequency. The memory controller has an interface 60 for receiving the memory access requests and a part 50 for outputting memory control signals. These signals are synchronized to the system clock so that there is a timing relationship with the actions of the processor which provides address inputs and reads or writes data at timings appropriate to the memory. Some of the timing characteristics of these signals are not entirely scalable, for example they may have a fixed range of values or an upper or lower limit in absolute time terms, which might be violated if the frequency is changed too far. This part for outputting the control signals can be implemented in the form of a state machine clocked by the system clock, which can reference timings stored in terms of numbers of clock cycles in internal or external storage, or can be implemented in other ways.

A link can be provided between the memory 20 and processor 10 which optionally carries data and address signals. Address signals are routed to memory controller 40 as an activity of the memory controller 40 is to decode a virtual address "0xabcdabcd" to a particular row (Row Address Signal) and column (Column Address Signal) within a certain memory bank and an offset to the requested word within the row. Data signals can also optionally be also routed through the controller. There are several reasons for this: 1) DRAM data signals are bidirectional (read/write) whereas CPU buses are unidirectional (separate lines for read and write data) and thus conversion is needed anyway, which is again a job of the memory controller; 2) retrieved (or written) data from (to) DRAM could be required to be stored locally before communicating back to CPU due to scheduling policy (i.e. QoS) on the bus or scheduling between different ports towards DRAM; 3) DRAM is typically located outside an IC and communicates with the IC via pads with buffers, level shifter, etc. These are the reasons why data signals are routed via the memory controller. The present invention includes however to connect these signals directly to the CPU bus.

FIG. 2 shows steps in operation of the embodiment of FIG. 1. At step 100 the system clock frequency is changed. The memory controller detects the change at step 110, or receives an alert from the processor or from any other external device, that the frequency has changed or is about to change. At step 120, the memory controller autonomously adapts the part for outputting the memory control signals, for example by changing the state machine, or by changing the stored timings, or selecting a different set of stored timings for example. When the processor requests a memory access, at step 130, the memory controller outputs new memory control signals synchronized to the changed system clock, but still having the non scalable timing characteristics.

FIGS. 3, 4 and 5, Embodiments with Additional Features

FIG. 3 shows an embodiment similar to that of FIG. 1, and so corresponding reference numerals have been used as appropriate. This figure also shows a bus interface 65, and a SYS CK frequency detection part 70 for detecting a change in frequency. The memory controller also has a store 80 for storing non scalable timing characteristics, and a store 90 for derived timing characteristics in terms of the new system clock frequency. Also in this embodiment a link can be provided between the memory 20 and processor 10 which optionally carries data and address signals. As for the embodiment of FIG. 1, address signals are routed to memory controller 40 as an activity of the memory controller 40 is to decode a virtual address "0xabcdabcd" to a particular row (Row Address Signal) and column (Column Address Signal) within a certain memory bank and an offset to the requested word within the row. Data signals can also optionally be also routed through the controller as explained above. The present invention includes however to connect these signals directly to the CPU bus.

Some of the steps in the operation of this embodiment are shown in FIG. 4. At step 100, the system clock frequency is changed. At step 110, the memory controller detects a change in frequency or is alerted to a change in frequency by some other device. As shown in step 200, the memory controller finishes current memory access and blocks further accesses. At step 210, the memory controller retrieves a timing representation in terms independent of the system clock frequency, and recalculates memory control signal timings in terms of system clock cycles at the new frequency at step 220. At step 230 the memory controller stores the recalculated memory control signal timings and unblocks further accesses. These timings can be for example in the form of list of on and off durations in terms of numbers of clock cycles, for each of the control signals. They could be expressed in relative terms to a base signal, to indicate only when their state differs for example. At step 240 when a memory access is requested, the memory controller now outputs memory control signals using recalculated timings. In some cases, the memory controller can be arranged to check first if the old timings could still meet the requirements including those which are not entirely scalable, when clocked at the new frequency.

FIG. 5 shows an alternative way of operating an embodiment, without the need to recalculate the timings. As in FIG. 4, at step 100, the system clock frequency is changed. At step 110, the memory controller detects a change in frequency or is alerted to a change in frequency by some other device. As shown in step 200, the memory controller finishes current memory access and blocks further accesses. At step 300, the memory controller determines which of many stored predetermined timing sequences based on system clock cycles corresponds to the new system clock frequency. This sequence is selected for use in future memory accesses. The memory controller then unblocks further accesses. At step 310, when a memory access is requested, the memory controller retrieves the selected timing sequence. At step 320, the memory controller outputs memory control signals using selected timing sequence.

Figure 7:
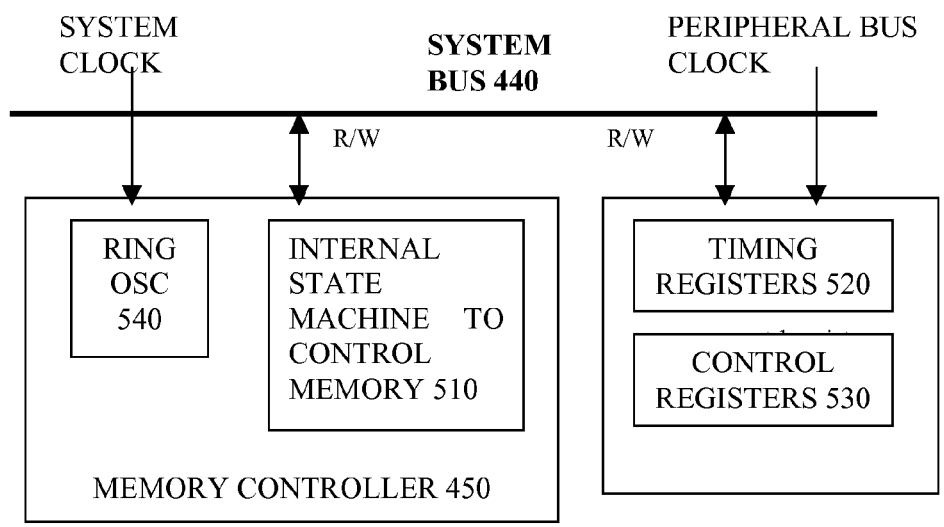

FIGS. 6 and 7, a Further Embodiment

FIGS. 6 and 7 show another embodiment. A processor (CPU 400) is coupled to a system bus 440. The processor runs a DFVS algorithm, and runs according to a cpu clock generated by a clock generator 420. Also coupled to the bus are direct memory access device DMA 430, and a memory controller 450. This provides control signals to a DRAM memory 460. Memory control registers 470 provide local storage for the memory controller, and is clocked by a peripheral bus clock signal from the clock generator. The registers are accessible via a peripheral bus 500 and a bus bridge 480. A hardware accelerator 490 is also shown coupled to the bus. In this case the system bus clock is the clock which synchronises the memory access across the bus. Hence the system bus clock is an example of the system clock referred to above.

More details of part of this embodiment are shown in FIG. 7. This shows the memory controller has a ring oscillator 540 to provide an internal clock independent of the system clock. This can enable the memory controller to detect frequency changes in the system clock. An internal state machine 510 is shown for generating the control signals for the memory. An example of memory control registers is also shown, in the form of timing registers 520 and control registers 530. Timing characteristics can be stored in the timing register independent of the system clock frequency. Characteristics can be converted or recalculated into a form related to a new clock frequency and stored in the control registers.

Frequency scaling is typically done by reprogramming the clock generation unit (CGU). Scaling clock frequency can be fast (i.e. enabling a divider) or rather slow (i.e. reprogramming a PLL) depending on the clock management design. Also for some systems during the clock scaling/switching transition period occasional glitches can be introduced in the clock signal to which the memory or memory controller can be sensitive. It is therefore much safer to disable any memory activity while the memory clock is being scaled/switched. This can be achieved by introducing a blocking mode to the memory controller if the bus is able to handle this. In this mode the memory controller raises a busy flag on the system bus such that none of the bus masters can initiate a bus transaction towards the memory. Before entering blocking mode memory controller first finishes all ongoing memory transactions.

At least three methods can be envisaged to let the memory controller know the clock frequency and for the memory controller to carry out the adaptation.

1. This method requires some minimal SW involvement. Before scaling the clock SW requests the memory controller to enter blocking mode (by writing to a certain control register) or the memory controller does this itself. The bus is then blocked to prevent any new memory access requests. After the new clock has been set-up on CGU side SW informs the memory controller about the new memory clock frequency (by a write to a frequency register) and requests the memory controller to recompute internal timing parameters. After a known delay or by observing a status flag SW releases the blocking mode, or the memory controller releases the blocking mode of the bus and the memory is ready to process all outstanding requests in an optimal way. Some optimization is possible here, such that updating a frequency register automatically leads to recalculation of timing parameters with blocking mode released automatically upon completion of this process.

2. This method requires no SW intervention. In this embodiment the memory controller is provisioned with a frequency measuring circuit (such as ring oscillator), which constantly monitors the live memory clock signal. Upon noticing a frequency change, the memory controller follows the following steps:
   a. Finish outgoing memory transaction
   b. Enter blocking mode by asserting busy signal on the bus
   c. Capture new frequency (wait until it stabilizes)
   d. Recalculate all timing parameters
   e. Exit blocking mode 3. In case the busy flag raised during reprogramming of the memory controller is not consistent with specific bus protocols, an option would be to store memory requests in a queue internally and serve the queue after reprogramming has finished. If local buffers are used and the requested data is available requests can be served immediately.

Note that the memory controller can undertake any required actions or output any sequence to make use of the memory in the most optimized way for a new system frequency. This mainly includes recalculating timing parameters in clocks for the internal state machine, but also reprogramming the memory itself for CAS delay for instance or other relevant frequency dependent memory parameters.

The total latency delay could be represented by the following formula:

$$T\text{latency} = T\text{finish\_transactions} + T\text{compute\_params} + T\text{memctrl\_reprog}$$

Note that Tfinish_transactions is short as it accounts for 2-4 bytes in 2-4 burst length only.

Embodiments described may be included within computer systems, such as within personal computers, work stations, smart phones, PDA's laptops, palmtops, etc.

Embodiments as described can provide a fast and efficient way for the memory controller to adapt to on-the-fly memory clock frequency scaling exploited by dynamic power management for ultra low-power devices. The advantages can be summarized as follows:

1. Shorter memory controller reprogramming latency, which allows more aggressive power savings without undesired distortion
2. Easy SW interface since SW involvement is either minimal or not required at all
3. Bus masters can be designed without memory access suspending mode, which simplifies their design.

The present invention also includes software having code segments such that when executed on a processing engine a method of producing digital memory control signals is executed that enables other devices to access a memory, the access being synchronized to a system clock, the control signals having some timing characteristics not entirely scalable with scaling of the system clock frequency. The software may be adapted for receiving a memory access request from the other device, outputting the digital memory control signals synchronized to the system clock in response to such a memory access request, and in response to an indication of a change in a frequency of the system clock, determining new digital memory control signals to be output, synchronized to the changed system clock and also having the non scalable timing characteristics.

The software when executed on a processing engine may provide a memory controller adaptable to scaling of a system clock frequency, and for producing digital memory control signals to enable other devices to access a memory, the access being synchronized to the system clock, the control signals having some timing characteristics not entirely scalable with scaling of the system clock frequency. The software may be adapted to provide an interface to receive a memory access request from the other device. The software may also be adapted to output the digital memory control signals synchronized to the system clock in response to such a memory access request. Further, in response to an indication of a change in a frequency of the system clock, the software may be adapted to enable an output of new digital memory control signals which are synchronized to the changed system clock and still have the non scalable timing characteristics. The software may be adapted to carry out the adapting by retrieving a stored representation of the non scalable timing characteristics, in terms not dependent on the system clock frequency. The software may be adapted to convert the retrieved representation into timing characteristics in terms related to the changed system clock frequency, for use in generating the new digital memory control signals.

The software may be adapted to carry out the adapting by selecting from a number of predetermined stored signal sequences, each corresponding to a different system clock frequency.

The software may be adapted for monitoring the system clock to detect the change in frequency and output the indication of the change. The software may be adapted to receive the indication of the change in system clock frequency from an external device.

The software may be adapted for use with an interface comprising a bus interface, and the software may be adapted to block any other devices coupled to the bus from initiating a memory access during adaptation. The control signals may be suitable for a dynamic memory device having a refresh cycle.

The software may be written in any suitable language, e.g. a high level language, an interpreted language etc. and then compiled on a compiler that is designed for the target processing engine on which the software is to run.

Other variations can be envisaged within the scope of the claims.

The invention claimed is:

1. A method of producing digital memory control signals to enable other devices to access a memory in synchronization with a system clock, the method comprising using a memory controller in communication with the memory to perform autonomously the steps of:
   receiving a memory access request from the one of the other devices;
   outputting digital memory control signals synchronized to the system clock to the memory in response to the memory access request, the digital memory control signals comprising non scalable timing characteristics comprising terms independent of a system clock frequency that are not scalable with scaling of the system clock frequency and scalable timing characteristics that depend on the system clock frequency;
   monitoring a system clock frequency; and
   determining and outputting new digital memory control signals that are different from the memory control signals output prior to the change of the clock frequency in response to a change of the system clock frequency, the new digital memory control signals including the scalable timing characteristics which are scaled according to the change in the system clock frequency, and the non scalable timing characteristics which are the same as in the digital memory control signals prior to the change of the clock frequency.

2. A non-transitory machine readable storage medium storing a computer program that when executed by a computer causes the computer to perform a method of producing digital memory control signals to enable other devices to access a memory in synchronization with a system clock, the method comprising using a memory controller in communication with the memory to perform autonomously the steps of:
   receiving a memory access request from the one of the other devices;
   outputting digital memory control signals synchronized to the system clock to the memory in response to the memory access request, the digital memory control signals comprising non scalable timing characteristics comprising terms independent of a system clock frequency that are not scalable with scaling of the system clock frequency and scalable timing characteristics that depend on the system clock frequency;
   monitoring a system clock frequency; and
   determining and outputting new digital memory control signals that are different from the memory control signals output prior to the change of the clock frequency in response to a change of the system clock frequency, the new digital memory control signals including the scalable timing characteristics which are scaled according to the change in the system clock frequency, and the non scalable timing characteristics which are the same as in the digital memory control signals prior to the change of the clock frequency.

3. A memory controller configured to produce digital memory control signals to enable other devices to access a memory in synchronization with a system clock, the memory controller comprising:
   an interface configured to receive a memory access request from one of the other devices; and
   a signal generation part configured to output the digital memory control signals synchronized to the system clock in response to the memory access request, the control signals comprising non scalable timing characteristics comprising terms independent of a system clock frequency that are not scalable with scaling of the system clock frequency, and scalable timing characteristics that depend on the system clock frequency;
   wherein, in response to a change of the system clock frequency, the signal generation part autonomously outputs new digital memory control signals different from the memory control signals output prior to the change of the clock frequency, the new digital memory control signals including the scalable timing characteristics which are scaled according to the change in the system clock frequency and the non scalable timing characteristics which are the same as in the digital memory control signals prior to the change of the clock frequency.

4. The memory controller of claim 3, wherein the memory controller further comprises a storing device configured to store a representation of the non scalable timing characteristics in order to adapt the signal generation part.

5. The memory controller of claim 4, wherein the memory controller is further configured to convert the retrieved representation into timing characteristics in terms related to the change in the system clock frequency, for use in generating the new digital memory control signals.

6. The memory controller of claim 3, wherein the memory controller is further configured to select from a number of predetermined stored signal sequences, each corresponding to a different system clock frequency, in order to adapt the signal generation part.

7. The memory controller of claim 3 further comprising a frequency change detector in communication with the system clock and configured to detect the change in the system clock frequency and to output an indication of the change.

8. The memory controller of claim 3, wherein the memory controller is in communication with an external device and is configured to receive an indication of the change in system clock frequency from the external device.

9. The memory controller of claim 3, wherein the interface comprises a bus interface, other devices being coupled to the bus interface, and the memory controller is configured to block any of the other devices coupled to the bus interface from initiating a memory access while the memory controller is adapting the signal generation part.

10. The memory controller of claim 3, wherein the memory control signals are suitable for a dynamic memory device having a refresh cycle.

11. A system comprising the memory controller of claim 3, a processor and the memory.

12. The system of claim 11, wherein the processor is configured to determine a level of processing demand, and to scale the system clock frequency according to the level of processing demand.

13. The memory controller of claim 3, wherein the memory controller further comprises internal registers, the internal registers comprising memory controller timing parameters and a current value for the system clock frequency, wherein the memory controller in adapting the signal generation part autonomously changes the memory controller timing parameters stored in the internal registers.

14. The memory controller of claim 3, wherein the signal generation part comprises an internal state machine comprising clock values for generating the digital memory control signals, wherein the memory controller in adapting the signal generation part autonomously changes the internal state machine.

15. A personal mobile device having the system of claim 11.

* * * * *